(12) United States Patent
Chang

(10) Patent No.: US 11,537,169 B2
(45) Date of Patent: Dec. 27, 2022

(54) FUNCTION EXPANSION ASSEMBLY AND ELECTRONIC DEVICE HAVING THE FUNCTION EXPANSION ASSEMBLY

(71) Applicant: Getac Technology Corporation, Hsinchu County (TW)

(72) Inventor: Kuang-Yeh Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/995,009

(22) Filed: Aug. 17, 2020

(65) Prior Publication Data
US 2022/0050508 A1 Feb. 17, 2022

(51) Int. Cl.
*G06F 1/16* (2006.01)
*G06F 1/18* (2006.01)

(52) U.S. Cl.
CPC ............ *G06F 1/1658* (2013.01); *G06F 1/183* (2013.01)

(58) Field of Classification Search
CPC ....................................................... H05K 5/00
See application file for complete search history.

(56) References Cited

U.S. PATENT DOCUMENTS

| 5,731,952 A * | 3/1998 | Ohgami ................ G06F 1/1635 361/679.48 |
| 2012/0099266 A1* | 4/2012 | Reber ..................... G06F 1/182 361/679.26 |
| 2021/0373607 A1 | 12/2021 | Chang |

\* cited by examiner

*Primary Examiner* — Jerry Wu
(74) *Attorney, Agent, or Firm* — Locke Lord LLP; Tim Tingkang Xia, Esq.

(57) ABSTRACT

An electronic device having a function expansion assembly includes a host, and a function expansion assembly for function expansion of the host. The host includes an opening and a fixing portion. The function expansion assembly includes a functional module and an anti-collision module. The functional module includes an expansion circuit board and an expansion connector disposed on the expansion circuit board. The expansion circuit board is detachably fixed at the fixing portion. The anti-collision module includes a covering and a lid. The covering is detachably fixed at the host and covers the opening, and includes an insertion slot. The lid corresponds to the position of the insertion slot, and is connected in a liftable and covering manner to the covering. The lid blocks the expansion connector by covering the insertion slot.

20 Claims, 12 Drawing Sheets

FUNCTION EXPANSION ASSEMBLY AND ELECTRONIC DEVICE HAVING THE FUNCTION EXPANSION ASSEMBLY

BACKGROUND OF THE INVENTION

Field of the Invention

The present invention relates to a function expansion of an electronic device, and more particularly to a function expansion assembly and an electronic device having the function expansion assembly.

Description of the Prior Art

Current electronic devices are installed with as many as possible modules of diversified functions in order to provide diversified functions. These modules are, for example, a USB module, a USB type-C module, an SD card module and a LAN module.

However, current electronic devices are developed also in aim of being light in weight and small in size, leading to a limited remaining space for installing these modules. Therefore, different modules need to be installed in a manner of replacement according to requirements in a same remaining space, which however leads to issues of being susceptible to collision and hence damage of the modules due to such replacement.

In the above conditions, it is a critical task of the present invention as how to effectively replace a required module while providing an anti-collision effect after the replacement.

SUMMARY OF THE INVENTION

It is an object of the present invention to provide a function expansion assembly and an electronic device having the function expansion assembly, so that the function expansion assembly can be freely replaced in a limited remaining space while providing an anti-collision effect.

To achieve the above object, a function expansion assembly for function expansion of an electronic device is provided according to an embodiment of the present invention. The electronic device includes an opening, and a fixing portion corresponding to the opening. The function expansion module includes: a functional module, including an expansion circuit board and an expansion connector disposed on the expansion circuit board, the expansion circuit board being detachably fixed at the fixing portion; and an anti-collision module, including a covering and a lid, the covering being detachably fixed at the electronic device and covering the opening, the covering having an insertion slot, the lid corresponding to the position of the insertion slot and connected in a liftable and covering manner to the covering, and the lid blocking the expansion connector by covering the insertion slot.

An electronic device having a function expansion assembly is provided according to another embodiment of the present invention. The electronic device includes: a host, including an opening, and a fixing portion corresponding to the opening; and a function expansion module. The function expansion module includes: a functional module, including an expansion circuit board, and an expansion connector disposed on the expansion circuit board, the expansion circuit board being detachably fixed at the fixing portion; and an anti-collision module, including a covering and a lid, the covering being detachably fixed at the host and covering the opening, the covering having an insertion slot, the lid corresponding to the position of the insertion slot and connected in a liftable and covering manner to the covering, and the lid blocking the expansion connector by covering the insertion slot.

The foregoing embodiments of the present invention provide at least one of the effects of allowing freely replacement of a required function expansion assembly in a limited remaining space of the host, while providing a functional module with an anti-collision effect of avoiding impact or collision.

DETAILED DESCRIPTION OF THE EMBODIMENTS

Details and technical contents of the embodiment of the present invention are given with the accompanying drawings below. However, the accompanying drawings are for reference and illustration purposes and are not to be construed as limitations to the present invention.

Figure 4:
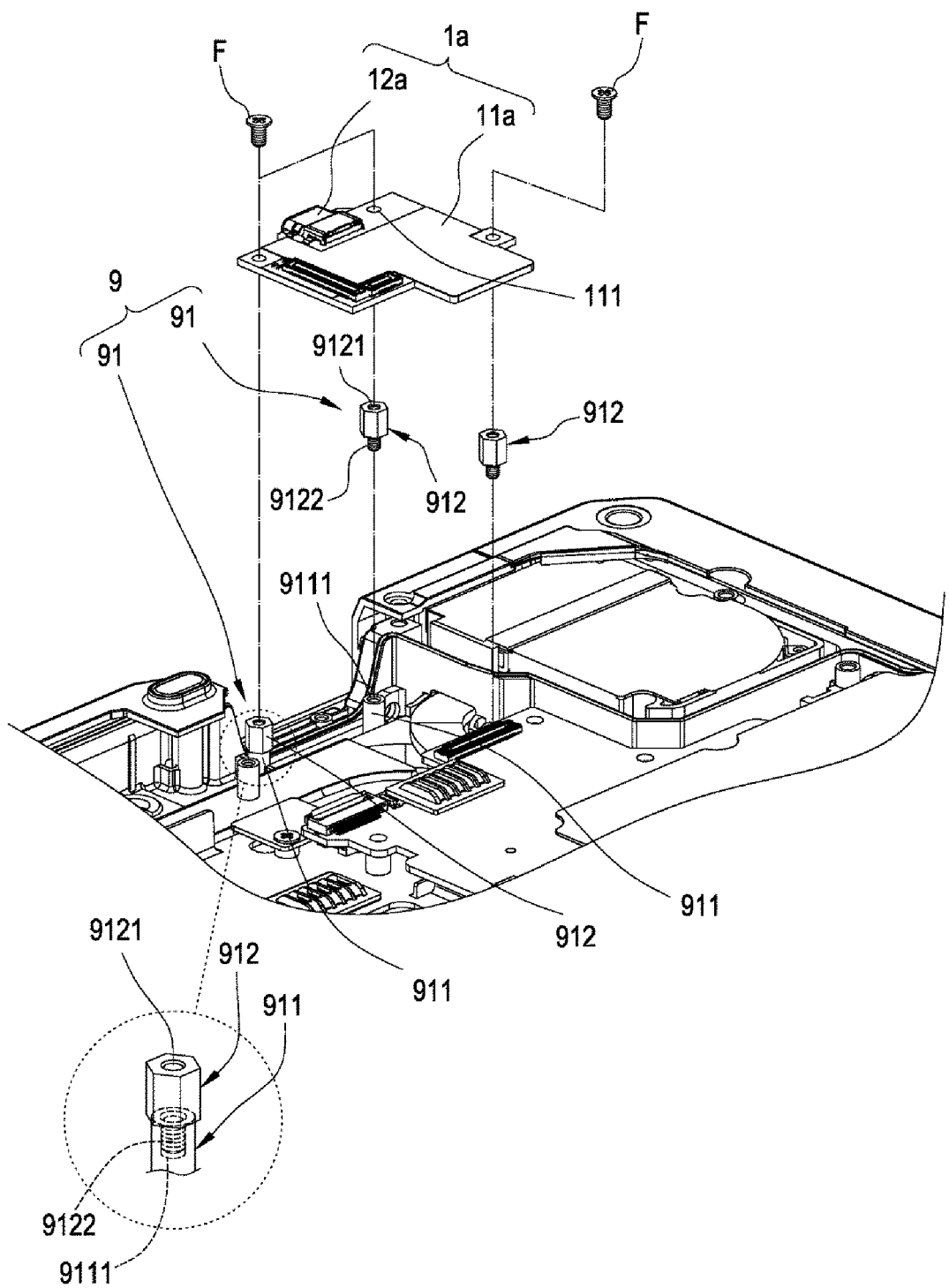
FIG. 4 is an exploded three-dimensional diagram of a functional module in an electronic device according to the first embodiment of the present invention.
Figure 5:
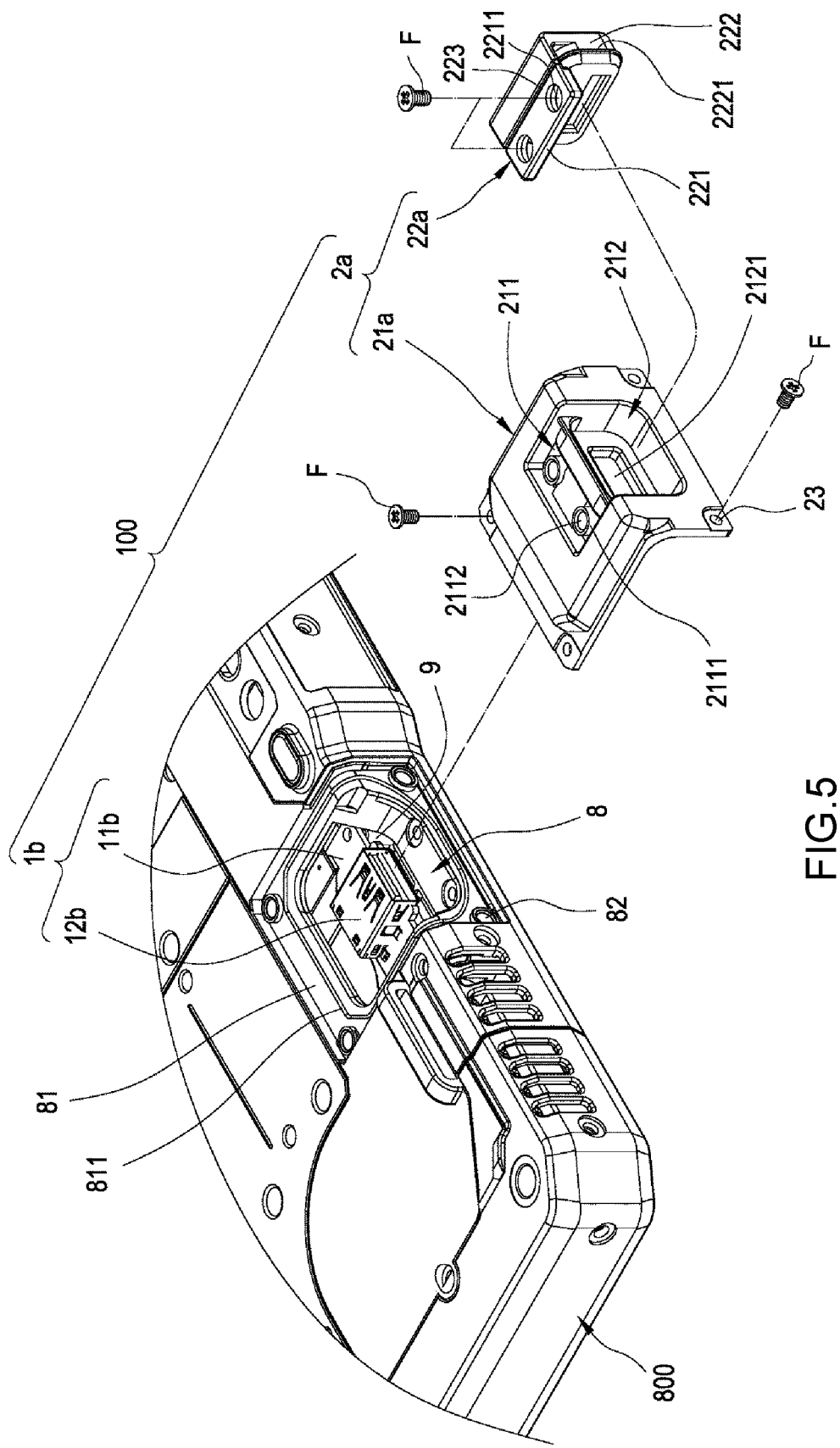
FIG. 5 is an exploded three-dimensional diagram of an electronic device according to a second embodiment of the present invention.
Figure 6:
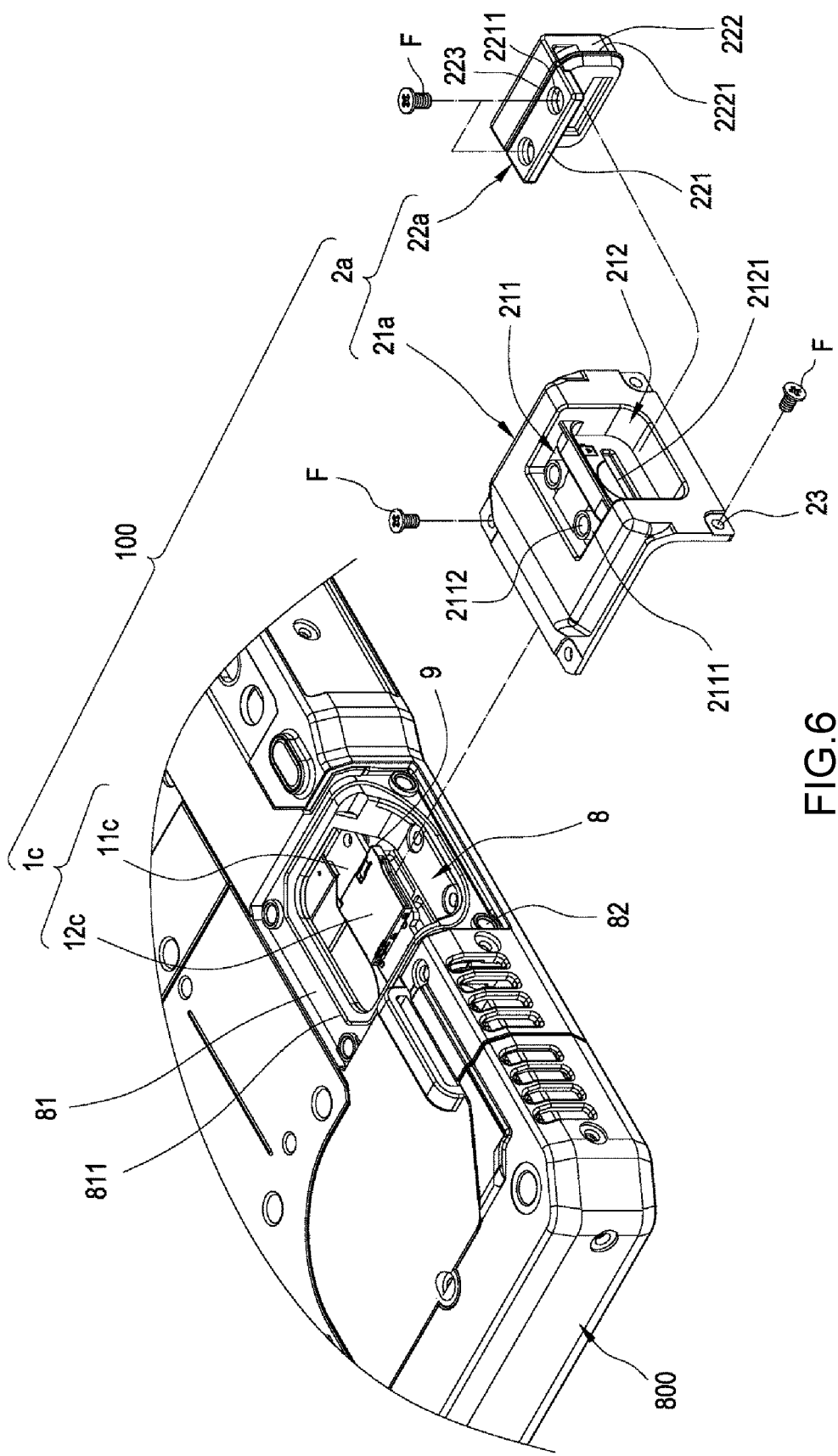
FIG. 6 is an exploded three-dimensional diagram of an electronic device according to a third embodiment of the present invention.
Figure 7:
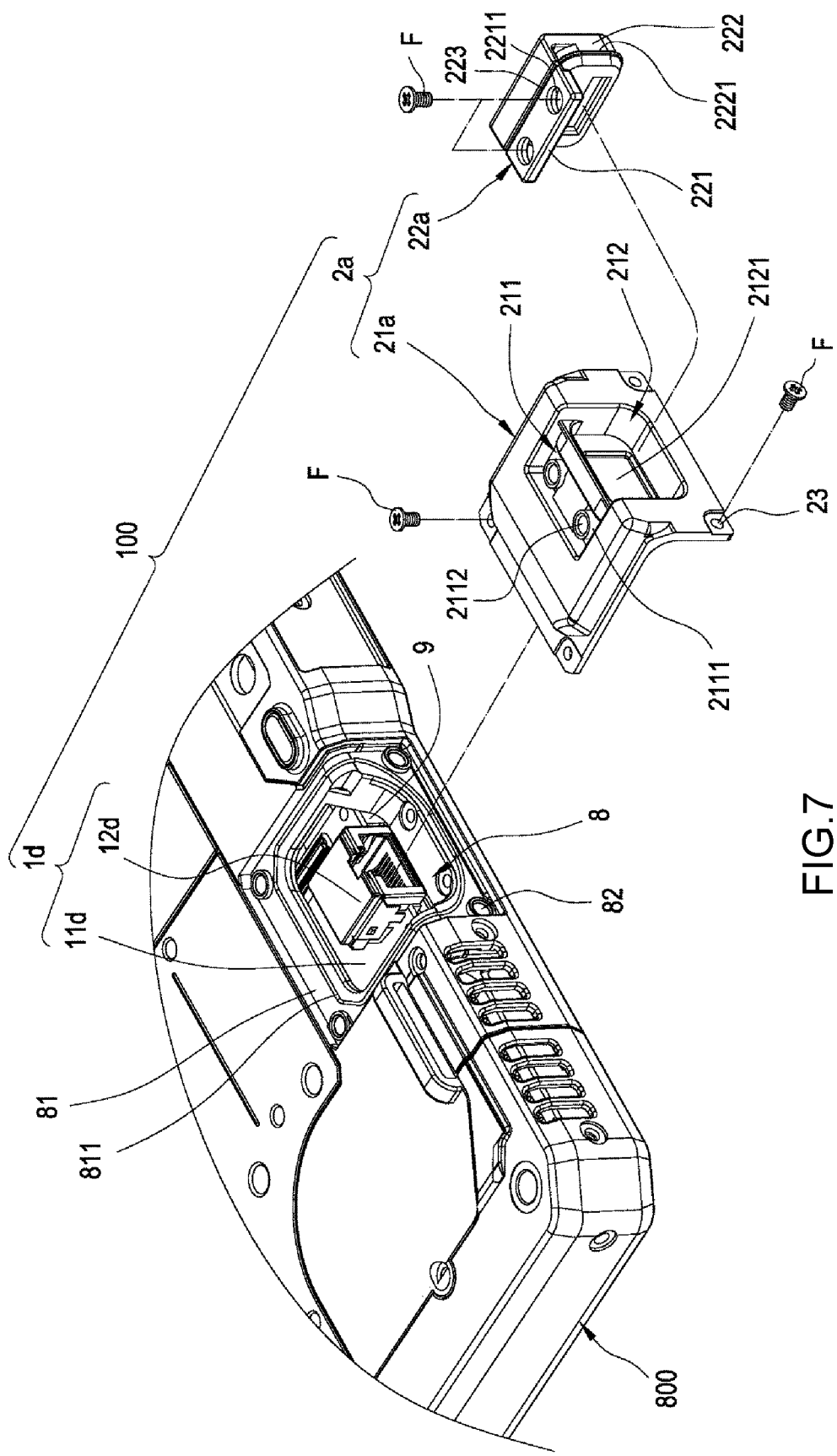
FIG. 7 is an exploded three-dimensional diagram of an electronic device according to a fourth embodiment of the present invention.
Figure 8:
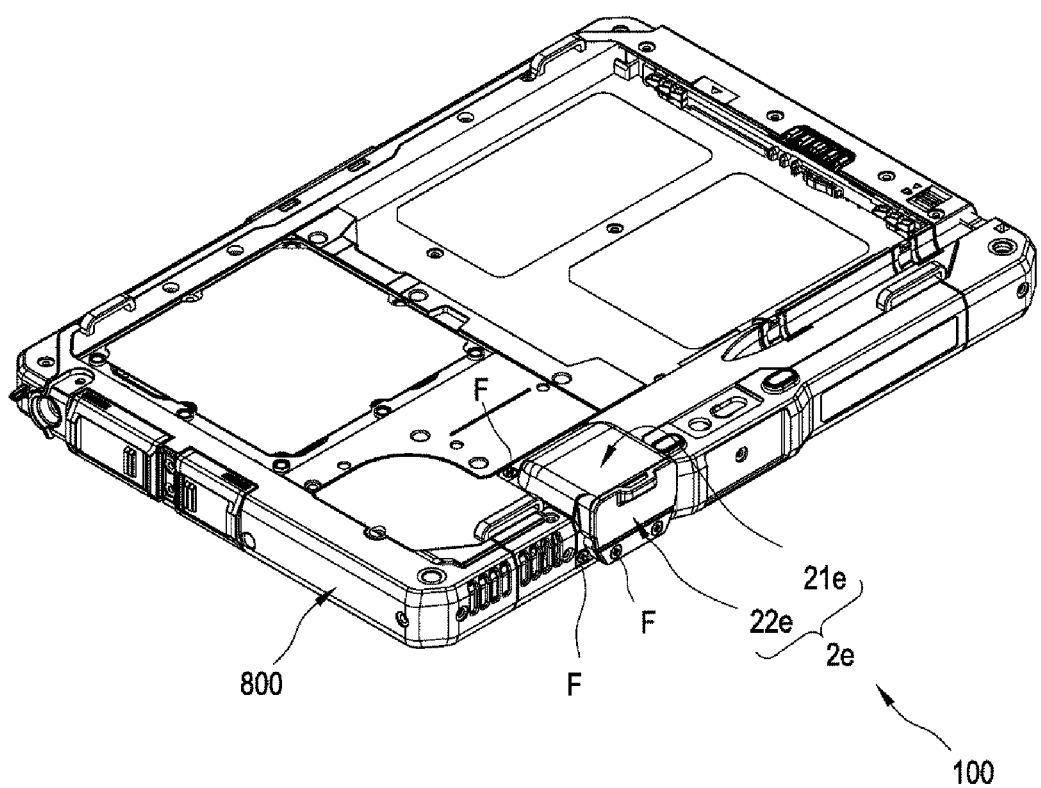
FIG. 8 is a three-dimensional assembly diagram of an electronic device according to a fifth embodiment of the present invention.
Figure 9:
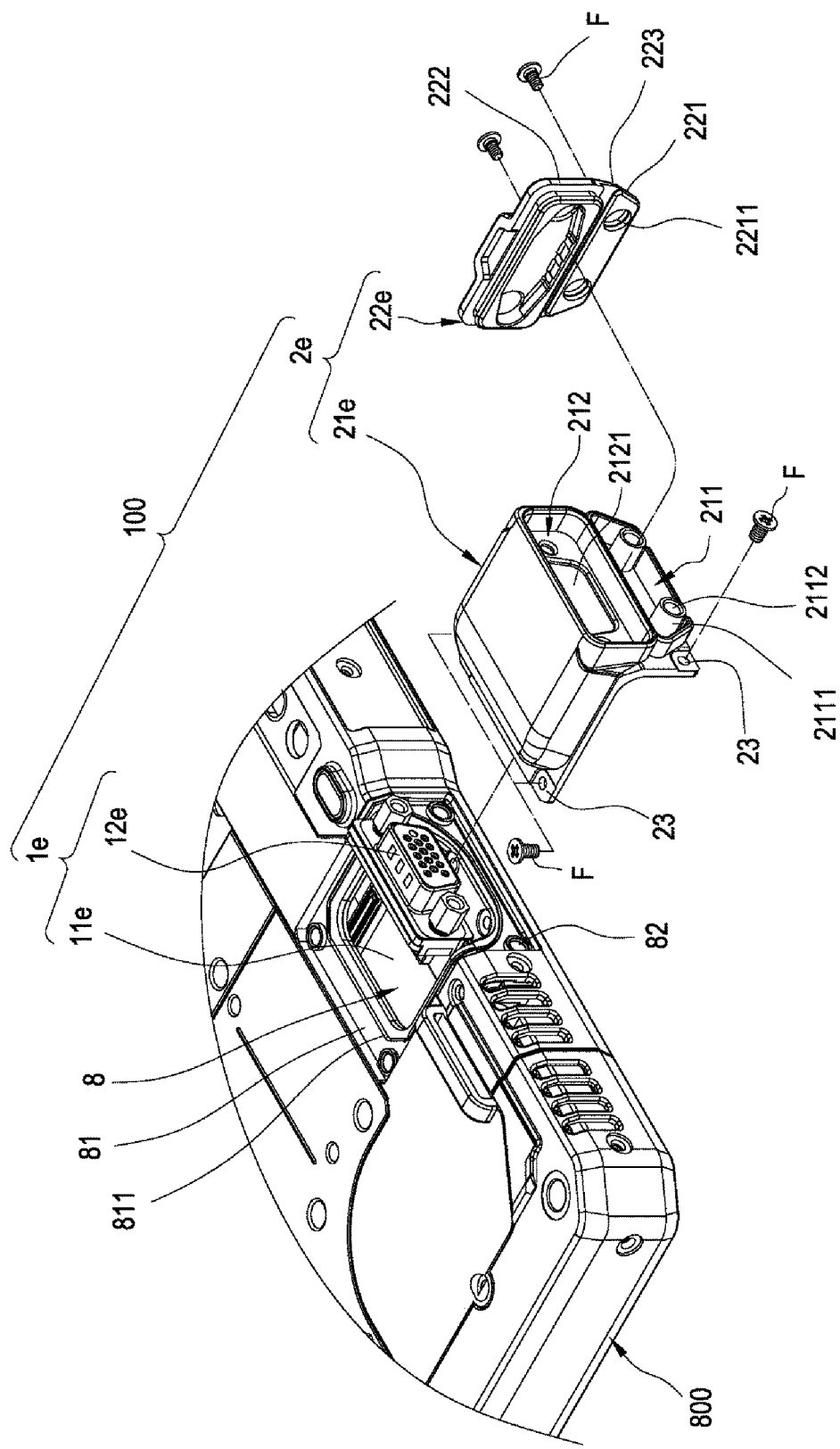
FIG. 9 is an exploded three-dimensional diagram of an electronic device according to the fifth embodiment of the present invention.
Figure 10:
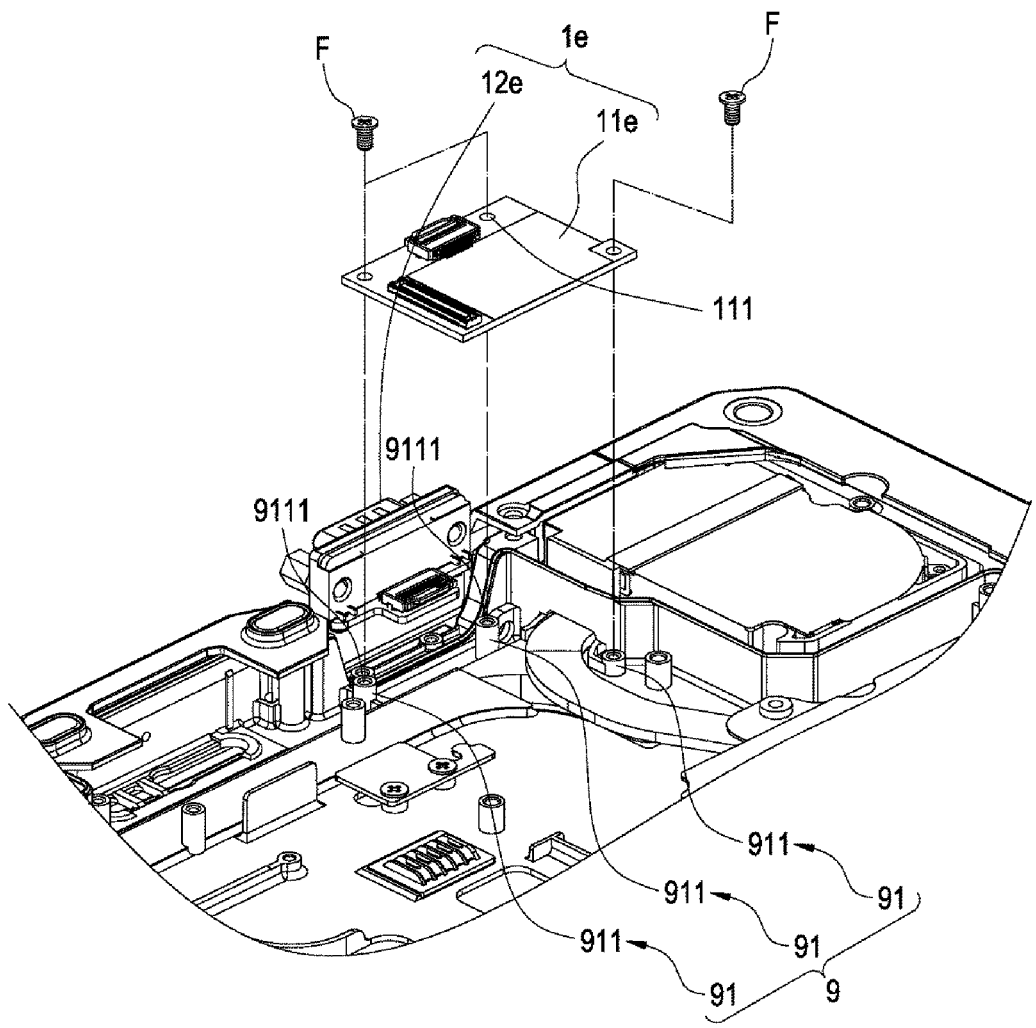
FIG. 10 is an exploded three-dimensional diagram of a functional module in an electronic device according to the fifth embodiment of the present invention.
Figure 11:
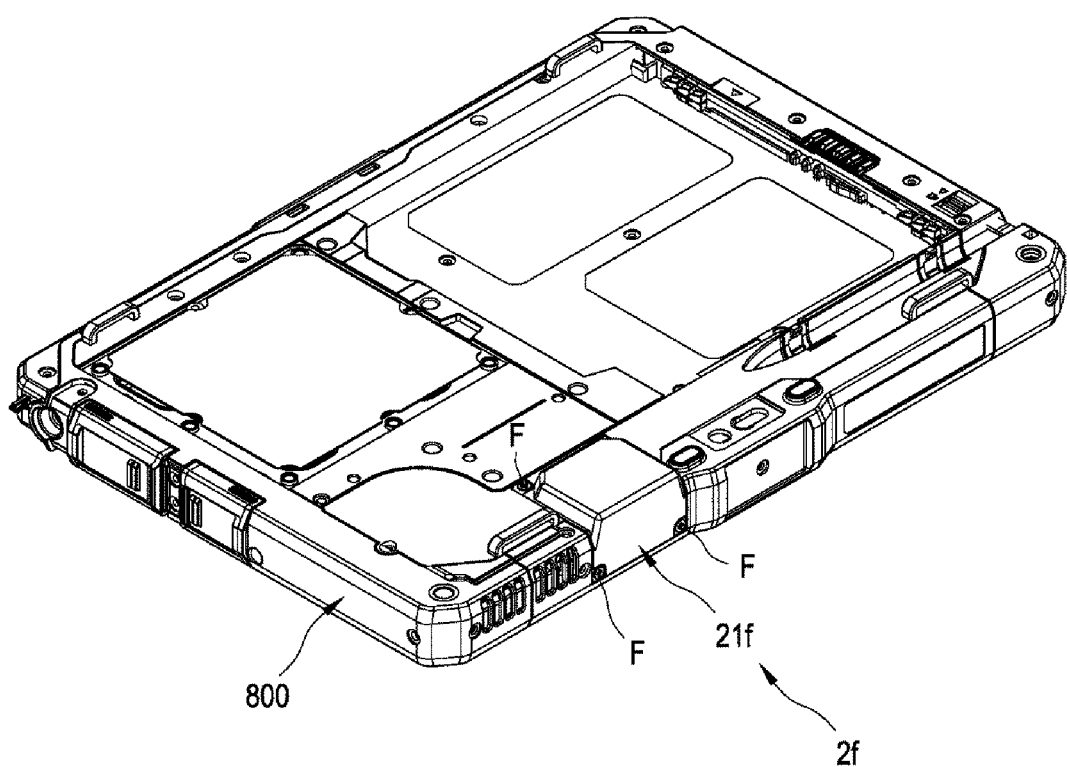
FIG. 11 is a three-dimensional assembly diagram of an electronic device according to a sixth embodiment of the present invention.
Figure 12:
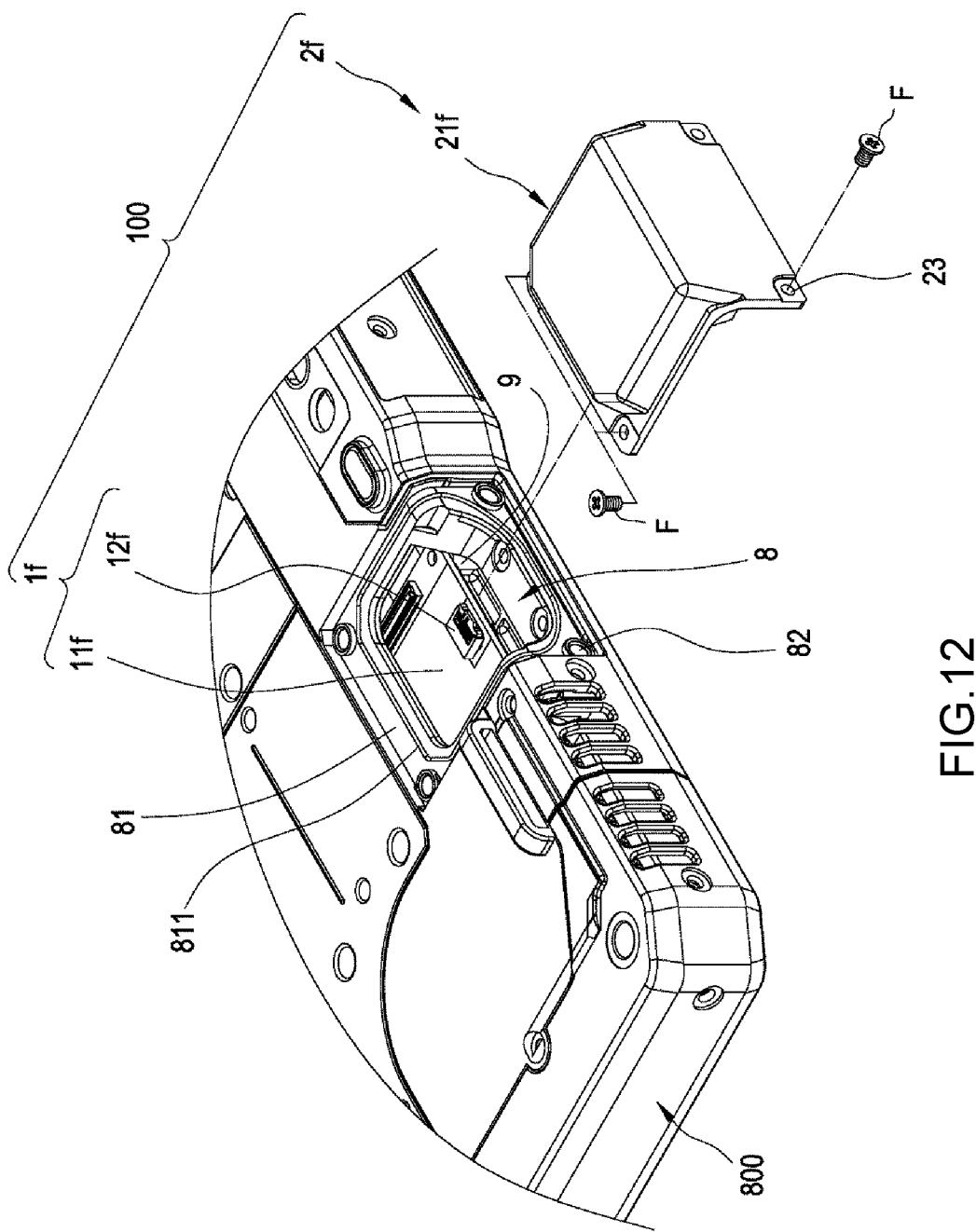
FIG. 12 is an exploded three-dimensional diagram of an electronic device according to the sixth embodiment of the present invention.

The embodiment of the present invention provides a function expansion assembly and an electronic device having the function expansion assembly. FIG. 1 to FIG. 4 show an electronic device having a function expansion assembly (to be together referred to as an electronic device hereinafter) according to a first embodiment of the present invention. FIG. 5, FIG. 6 and FIG. 7 show an electronic device according to second, third and fourth embodiments of the present invention. FIG. 8 to FIG. 10 show an electronic device according to a fifth embodiment of the present invention. FIG. 11 and FIG. 12 show an electronic device according to a sixth embodiment of the present invention.

As shown in FIG. 1 to FIG. 4, an electronic device according to the first embodiment of the present invention includes a host (a host of the electronic device) 800 and a function expansion assembly 100.

The host 800 is provided with an opening 8. The opening 8 crosses two adjacent sides of the host 800, and for example, crosses a large-area side (e.g., an obverse side or a reverse side) and a thickness side (e.g., one of the four lateral sides) of the host 800. The host 800 is provided therein with a fixing portion 9 for fixing purposes, and the fixing portion 9 corresponds to the opening 8 so as to facilitate fixing through the opening 8. As shown in FIG. 4, the fixing portion 9 includes a plurality of fixing structures 91, each of which is fixed in the host 800 and has a first fixing hole 9121.

The function expansion assembly 100 includes a functional module 1a and an anti-collision module 2a. The functional module 1a is for function expansion of the host 800, and the anti-collision module 2a is primarily for preventing the functional module 1a from receiving impact.

The functional module 1a may be various types of modules of required functions, and is exemplified by USB type-C for illustrations in this embodiment. The functional module 1a includes an expansion circuit board 11a, and an expansion connector 12a disposed on the expansion circuit board 11a. As shown in FIG. 4, the expansion circuit board 11a is provided with a plurality of second fixing holes 1111 respectively corresponding to the first fixing holes 9121.

For expansion, by disposing the expansion circuit 11a correspondingly to the fixing portion 9, the first fixing holes 9121 and the second fixing holes 1111 can be corresponded with each other. Next, by detachably fixing a fixing element F between each of the first fixing holes 9121 and each of the second fixing holes 1111, the functional module 1a can then be detachably fixed at the fixing portion 9 through the expansion circuit 11a. Thus, even if the available remaining space on the electronic device is limited, the object of function expansion can be similarly achieved by means of replacing different functional modules (e.g., 1a).

It should be noted that, functional modules 1a of different functions may have different height requirements with respect to the fixing portion 9. Thus, when the functional module for expansion requires a lower height, the height of the fixing structure 91 does not need to be large, for example, a fixing column 911 is needed, with the fixing column 911 being fixed in the host 800 and having the foregoing first fixing hole (not denoted by numerals). Conversely, if the functional module for expansion requires a larger height (e.g., the functional module 1a of this embodiment), the fixing structure 91 needs to further include a height padding column 912, so as to serially connect the fixing column 911 and the height padding column 912 to increase the height.

In continuation of the above description, in the fixing structure 91 requiring additional height, the fixing column 911 is fixed in the host 800 and has a counterpart fixing hole 9111, and the height padding column 912 includes a fixing member 9122 and the foregoing first fixing hole 9121. To increase the height of the fixing portion 9, by detachably fixing and connecting the height padding columns 912 to the counterpart fixing holes 9111 of the fixing columns 911 by the fixing member 9122, the fixing structures 91 can be provided with the required height by means of head-tail serial connection. In other words, the height padding columns 912 may have different lengths.

To fix the functional module 1a at a required height, in addition to adjusting the fixing structures 91 to the required height, the fixing elements F are further required to be respectively detachably fixed between the second fixing holes 111 of the expansion circuit board 11a and the first fixing holes (e.g., the first fixing holes 9121 of the height padding columns 912) of the fixing structures 91.

The anti-collision module 2a includes a covering 21a and a lid 22a. The covering 21a is for covering the opening 8 and is provided with an insertion slot 2121. The insertion slot 2121 corresponds to a port (not denoted by numerals) of the expansion connector 12a. The lid 22a is connected in a liftable and covering manner to the covering 21a, so as to expose the insertion slot 2121 when lifted open or to block the insertion slot 2121 when closed for covering.

The covering 21a has a shape corresponding to that of the opening 8, and is formed as an L-shaped bend, and can thus completely cover the opening 8. A flange 81 projects from an inner periphery of the host 800 corresponding to the opening 8, and surrounds correspondingly to the opening 8. Hence, when the covering 21a covers correspondingly to the opening 8, the covering 21a is blocked by the flange 81. At this point, even if the anti-collision module 2a receives the impact of an external force, the covering 21a is, using the blocking of the flange 81, prevented from being withdrawn inward toward the host 800, further avoiding issues of collision and damage of the functional module 1a caused by inappropriate inward withdrawal of the covering 21a. Thus, in addition to preventing the functional module 1a from encountering direct impact, the anti-collision module 2a further prevents the functional module 1a from indirect impact of the covering 21a.

Figure 1:
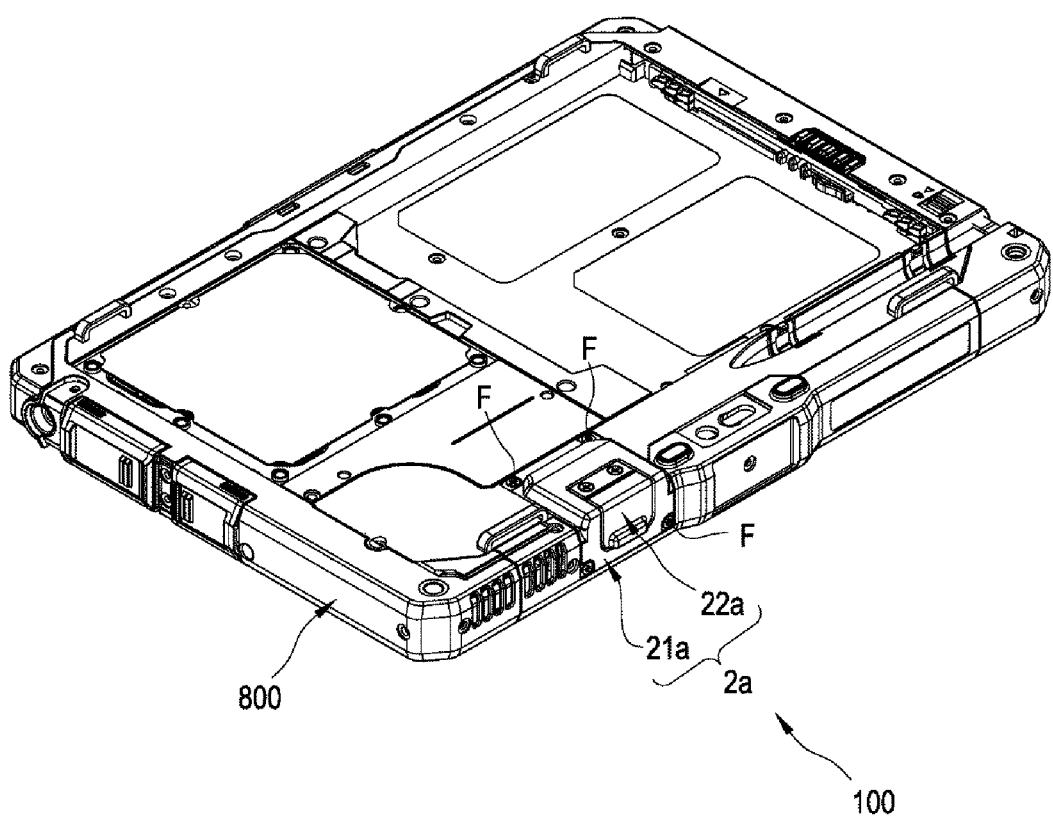
FIG. 1 is a three-dimensional assembly diagram of an electronic device according to a first embodiment of the present invention.
Figure 2:
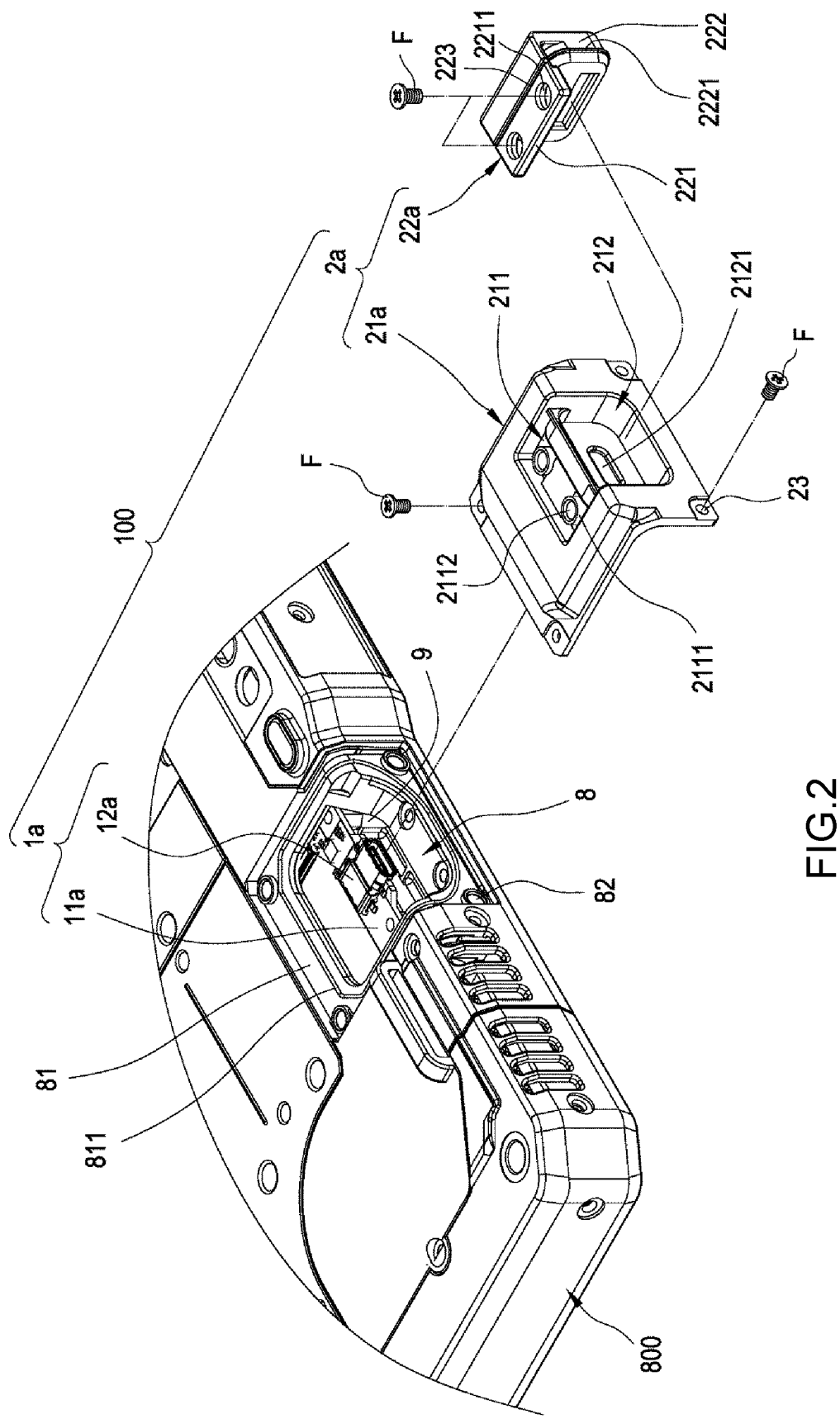
FIG. 2 is an exploded three-dimensional diagram of an electronic device according to the first embodiment of the present invention.
Figure 3:
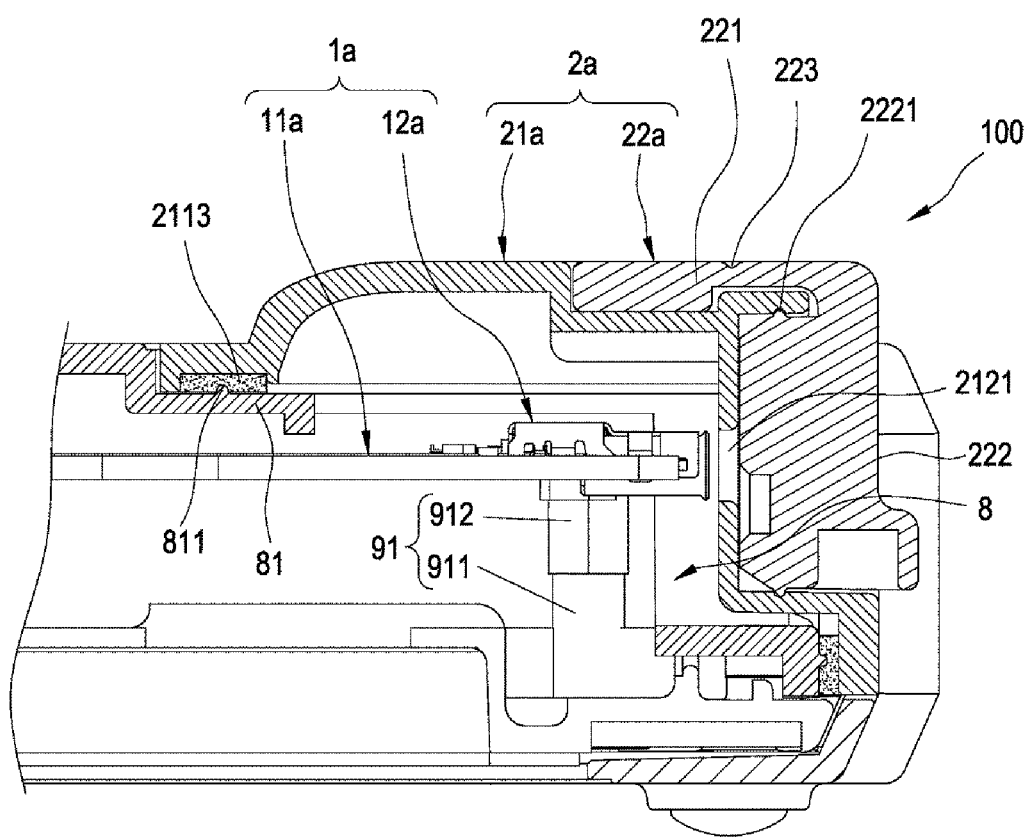
FIG. 3 is a section diagram of an electronic device after assembly according to the first embodiment of the present invention.

As shown in FIG. 2 and FIG. 3, a rib 811 (or an elastic portion 2113) may be further provided on an outer side of the flange 81, and an elastic portion 2113 (or a rib 811) may be further provided on an inner side of the covering 21a. The rib 811 also surrounds correspondingly to the opening 8. In addition to being directly formed on the inner side (or the outer side of the flange 81) of the covering 21a, the elastic portion 2113 may be an elastic lining or a waterproof foam sponge additional provided, as shown in the drawings; however, the present invention is not limited to the above examples. The flange 81 and the covering 21a are provided with a plurality of third fixing holes 82 and a plurality of fourth fixing holes 23 corresponding to each other, respectively. By respectively fixing the plurality of fixing elements F between the third fixing holes 82 and the fourth fixing holes 23, the covering 21a may be detachably fixed to the flange 81 in a manner of corresponding to the opening 8. Thus, when the covering 21a is fixed at the flange 81 by the fixing elements F, the elastic portion 2113 is pressed by the rib 811 and correspondingly becomes elastically recessed (see FIG. 3) to further provide better waterproofness, such that the anti-collision module 2a further provides waterproof and dustproof effects, while providing an effect of enabling the covering 21a to be stably coupled to the host 800.

The lid 22a has a shape corresponding to that of the covering 21a, and is also formed as an L-shaped bend (as shown in FIG. 2 and FIG. 3). The lid 22a includes a fixing plate 221, a movable plate 222, and a bending portion 223 connected between the fixed plate 221 and the movable plate 222. The covering 21a further includes a first recess 211 and a second recess 212 adjacent to each other. The first recess 211 and the second recess 212 are both recessed from the opening 8 toward the interior of the host 800. The first recess 211 is provided therein with a plurality of (at least two) in-recess fixing columns 2111, each of the in-recess fixing columns 2111 is provided with a fifth fixing hole 2112, and the second recess 212 is provided therein with the foregoing insertion slot 2121.

The fixing plate 221 is provided with a plurality of sixth fixing holes 2211. By correspondingly embedding the fixing plate 221 in the first recess 211, the fifth fixing holes 2112 and the sixth fixing holes 2211 may be respectively corresponded to each other, thus facilitating the plurality of fixing elements F to be respectively detachably fixed between the fifth fixing holes 2112 and the sixth fixing holes 2211, enabling the fixing plate 211 to be detachably fixed in the first recess 211 of the covering 21a. It should be noted that, even if the covering 21a has a small thickness, the fixing elements F can be provided with a longer fixing length using the in-recess fixing columns 2111, further providing a stable coupling effect.

The movable plate 222 can bend relative to the fixing plate 221 through the bending portion 223, for example, to be lifted open or closed by bending, and can be embedded in the second recess 212 when the covering the insertion opening 2121. As shown in FIG. 2 and FIG. 3, a peripheral rib 2221 projects from an outer periphery of the movable plate 222. When the movable plate 222 is correspondingly embedded in the second recess 212, the peripheral rib 2221 can be abutted against an inner periphery of the second recess 212, hence producing waterproof and dustproof effects for the insertion slot 2121 between the movable plate 222 and the second recess 212.

FIG. 5, FIG. 6 and FIG. 7 show an electronic device according to the second, third and fourth embodiments of the present invention. The second, third and fourth embodiments are substantially the same with the first embodiment, and differ merely in that different functional modules 1b, 1c and 1d are selected in the second, third and fourth embodiments. The functional modules 1b, 1c and 1d comprise respective expansion circuit boards 11b, 11c and 11d, and respective expansion connectors 12b, 12c and 12d.

The functional modules 1b, 1c and 1d are respectively exemplified by USB, an SD card and LAN in the second, third and fourth embodiments, and may thus respectively include the expansion connectors 12b, 12c and 12d that are respectively a USB connector, a card connector and a network connector.

The anti-collision module 2a of the first embodiment is used in continuation, given that the height (not shown) of the fixing structures 91 is correspondingly adjusted with respect to different height requirements. Although the anti-collision module 2a of the first embodiment is used in the second, third and fourth embodiments, due to different shapes of the ports (not denoted by numerals) of the expansion connectors 12b, 12c and 12d, the insertion slot 2121 of the covering 21a in the second, third and fourth embodiments also needs to be in corresponding shapes.

FIG. 8 to FIG. 10 show an electronic device according to the fifth embodiment of the present invention. The fifth embodiment is substantially the same with the first embodiment, and differs merely in that the function expansion assembly 100 selected in the fifth embodiment is different from that in the first embodiment. In the fifth embodiment, the function expansion assembly 100 includes a functional module 1e and an anti-collision module 2e.

The functional module 1e is exemplified by VGA in the fifth embodiment for illustration purposes, and thus includes an expansion circuit board 11e and an expansion connector 12e that may be a VGA connector and electrically connected to the expansion circuit board 11e. As the functional module 1e requires a smaller height, each of the fixing structures 91 includes only one fixing column 911, and each fixing column 911 is fixed in the host 800 and has a first fixing hole 9111. To fix the functional module 1e at a required height, the fixing elements F may be directly detachably fixed between the second fixing holes 111 of the expansion circuit board 11e and the first fixing holes 9111 of the fixing structures 91, respectively.

The anti-collision module 2e is substantially the same with that of the first embodiment, and differs merely by corresponding changes made to adapt to the different functional module 1e. The anti-collision module 2e includes a covering 21e and a lid 22e. Although the covering 21e is also formed as an L-shaped bend and has a second surface portion (not denoted by numerals), in order adapt to the functional module 1e, the first recess 211 and the second recess 212 are disposed side by side on the same surface portion (a lower surface portion in FIG. 9) of the L-shaped bend. In contrast, in this first embodiment, the first recess 211 and the second recess 212 are respectively disposed on two surface portions of the L-shaped bend.

The lid 22e is substantially the same with that of the first embodiment, and differs merely by corresponding changes made to adapt to the different covering 21e. The lid 22e has a shape corresponding to the lower surface portion of the covering 21e and is formed as a plane in shape. The lid 22e similarly includes a fixing plate 221, a movable plate 222, and a bending portion 223 connected between the fixing plate 221 and the movable plate 222. The fixing plate 221 is detachably fixed in the first recess 211 of the covering 21e. The movable plate 222 can bend relative to the fixing plate 221 through the bending portion 223, for example, to be lifted open or closed by bending, and be embedded in the second recess 212 when the covering the insertion opening 2121.

FIG. 11 and FIG. 12 show an electronic device according to the sixth embodiment of the present invention. The sixth embodiment is substantially the same with the first embodiment, and differs merely in that the function expansion assembly 100 selected in the sixth embodiment is different from that in the first embodiment. In the sixth embodiment, the function expansion assembly 100 includes a functional module 1f and an anti-collision module 2f.

The functional module 1f is exemplified by RFID in the sixth embodiment for illustrations, and thus includes an expansion circuit board 11f and an expansion connector 12f that may be an RFID connector.

The anti-collision 2f is the same with the first embodiment in terms of only the L-shaped bend, and does not include the lid but only includes only the covering 21f that is similarly an L-shaped bend because no other external electronic product needs to be additionally plugged. An antenna (not shown) is fixedly provided on an inner surface of the covering 21f, such that the antenna can be plugged to the expansion connector 12f by a plug (not shown).

Accordingly, the opening 8 provided at the host 800 of the embodiment of the present invention, in addition to facilitating replacement of the functional modules 1a, 1b, 1c, 1d, 1e and if using the part on the large-area side of the host 800, further allows an external electronic product (not shown) to be readily plugged using the part on the thickness side of the host 800, and even enables the anti-collision modules 2a, 2e and 2f to provide, by the flange 81 projecting from the inner periphery of the opening 8, an effect of preventing the functional modules from impact or collision, preferably, as well as waterproof and dustproof effects. Further, since the function expansion assembly 100 is a discrete structure of a detachable assembly, the combination thereof can be freely changed according to requirements. Moreover, the height of the fixing structures 91 can be easily adjusted with respect to different height requirements because the fixing portion 9 is disposed at a position corresponding to the opening 8.

The electronic device in the foregoing embodiments is, for example, a display, a tablet computer or a laptop computer; however, the present invention is not limited thereto.

In conclusion, the function expansion assembly and the electronic device having the function expansion assembly in the foregoing embodiments are capable of achieving expected application objects, and resolve drawbacks of the prior art. Therefore, the embodiment of the present invention fully meets patentable requirements, and an application for a patent is filed accordingly. Granting of patent rights is respectfully requested so as to ensure the rights of the inventor.

The above descriptions are at least one of feasible embodiments of the present invention, and are not to be construed as limitations to the present invention. Equivalent structural changes made on the basis of the description and drawings of the present invention should therefore be encompassed with the scope of the appended claims of the present invention.

What is claimed is:

1. A function expansion assembly, for function expansion of an electronic device, the electronic device comprising an opening, a fixing portion corresponding to the opening, an observe side and a reverse side opposite to each other and a plurality of lateral sides adjacent to the observe side and the reverse side, and wherein the opening crosses the reverse side and one of the lateral sides, the function expansion assembly comprising:
   a functional module, comprising an expansion circuit board and an expansion connector disposed on the expansion circuit board, the expansion circuit board being detachably fixed at the fixing portion so that the functional module is replaceable through the opening; and
   an anti-collision module, comprising a covering and a lid, the covering being detachably fixed at the electronic device and covering the opening, the covering having an insertion slot, the lid corresponding to a position of the insertion slot and being connected in a liftable and covering manner to the covering, and the lid blocking the expansion connector by covering the insertion slot,
   wherein when the covering of the anti-collision module covers the opening, the insertion slot is positioned to align with the expansion connector, allowing an external electronic connector to connect threrethrough.

2. The function expansion assembly according to claim 1, wherein the covering comprises a first recess and a second recess, the second recess is provided with the insertion slot, the lid comprises a fixing plate, a movable plate and a bending portion connected between the fixing plate and the movable plate, the fixing plate is fixed in the first recess, and the movable plate is accommodated in a liftable and covering manner by the bending portion in the second recess.

3. The function expansion assembly according to claim 2, wherein the covering further comprises a plurality of in-recess fixing columns projecting from the first recess, each of the in-recess fixing columns has a fixing hole, the fixing plate is provided with a plurality of fixing holes, the plurality of fixing holes of the fixing plate respectively correspond to the plurality of fixing holes of the in-recess fixing columns, and the lid is detachably fixed to the covering by a fixing element fixed between each of the plurality of fixing holes of the fixing plate and each of the plurality of fixing holes of the in-recess fixing columns.

4. An electronic device, comprising:
   a host, comprising an opening, a fixing portion corresponding to the opening, and a corner defined by two adjacent sides, wherein the opening crosses the two adjacent sides at the corner; and
   a function expansion assembly, comprising:
      a functional module, comprising an expansion circuit board and an expansion connector disposed on the expansion circuit board, the expansion circuit board being detachably fixed at the fixing portion so that the functional module is replaceable through the opening; and
      an anti-collision module, comprising a covering and a lid, the covering being detachably fixed at the host and covering the opening, the covering having an insertion slot, the lid corresponding to a position of the insertion slot and being connected in a liftable and covering manner to the covering, and the lid blocking the expansion connector by covering the insertion slot,
      wherein when the covering of the anti-collision module covers the opening, the insertion slot is positioned to align with the expansion connector, allowing an external electronic connector to connect threrethrough.

5. The electronic device according to claim 4, wherein the fixing portion comprises a plurality of fixing structures, each of the fixing structures is fixed on the host and has a first fixing hole, the expansion circuit is provided with a plurality of second fixing holes respectively corresponding to the plurality of first fixing holes, and the expansion circuit board is detachably fixed at the fixing portion by a fixing element fixed between each of the plurality of first fixing holes and each of the plurality of second fixing holes.

6. The electronic device according to claim 5, wherein each of the fixing structures comprises a fixing column fixed on the host, and the fixing column has the first fixing hole.

7. The electronic device according to claim 5, wherein each of the fixing structures comprises a fixing column and a height padding column, the fixing column is fixed on the host and has a counterpart fixing hole, the height padding column has the first fixing hole and a fixing member, the fixing structure is increased in height by fixing the fixing member to the counterpart fixing hole of the fixing column using the height padding column, and each of the fixing elements is detachably fixed between each of the plurality of second fixing holes of the expansion circuit board and the first fixing hole of each of the height padding column.

8. The electronic device according to claim 4, wherein the host comprises a flange formed correspondingly to the opening, the flange and the covering are respectively provided with a plurality of third fixing holes and a plurality of fourth fixing holes, and the covering is detachably fixed to the host by a fixing element fixed between each of the plurality of third fixing holes and each of the plurality of fourth fixing holes.

9. The electronic device according to claim 4, wherein the host comprises a flange formed correspondingly to the opening, the flange and an inner side of the covering respectively comprise a rib and an elastic portion, both the flange and the rib surround correspondingly to the opening, and the elastic portion is fixed at the host by the covering and is pressed by the rib to be correspondingly elastically recessed.

10. The electronic device according to claim 4, wherein the covering comprises a first recess and a second recess, the second recess is provided with the insertion slot, the lid comprises a fixing plate, a movable plate and a bending portion connected between the fixing plate and the movable plate, the fixing plate is fixed in the first recess, and the movable plate is accommodated in a liftable and covering manner by the bending portion in the second recess.

11. The electronic device according to claim 10, wherein the covering further comprises a plurality of in-recess fixing columns projecting from the first recess, each of the in-recess fixing columns has a fifth fixing hole, the fixing plate is provided with a plurality of sixth fixing holes respectively corresponding to the plurality of fifth fixing holes, and the lid is detachably fixed to the covering by a fixing element fixed between each of the plurality of fifth fixing holes and each of plurality of the sixth fixing holes.

12. An electronic device, comprising:
a host, comprising an opening and a fixing portion corresponding to the opening, wherein the host includes an observe side and a reverse side opposite to each other and a plurality of lateral sides adjacent to the observe side and the reverse side, and wherein the opening crosses the reverse side and one of the lateral sides; and
a function expansion assembly, comprising:
a functional module, comprising an expansion circuit board and an expansion connector disposed on the expansion circuit board, the expansion circuit board being detachably fixed at the fixing portion so that the functional module is replaceable through the opening; and
an anti-collision module, comprising a covering and a lid, the covering being detachably fixed at the host and covering the opening, the covering having an insertion slot, the lid corresponding to a position of the insertion slot and being connected in a liftable and covering manner to the covering, and the lid blocking the expansion connector by covering the insertion slot, allowing an external electronic connector to connect threrethrough.

13. The electronic device according to claim 12, wherein the fixing portion comprises a plurality of fixing structures, each of the fixing structures is fixed on the host and has a first fixing hole, the expansion circuit is provided with a plurality of second fixing holes respectively corresponding to the plurality of first fixing holes, and the expansion circuit board is detachably fixed at the fixing portion by a fixing element fixed between each of the plurality of first fixing holes and each of the plurality of second fixing holes.

14. The electronic device according to claim 13, wherein each of the fixing structures comprises a fixing column fixed on the host, and the fixing column has the first fixing hole.

15. The electronic device according to claim 13, wherein each of the fixing structures comprises a fixing column and a height padding column, the fixing column is fixed on the host and has a counterpart fixing hole, the height padding column has the first fixing hole and a fixing member, the fixing structure is increased in height by fixing the fixing member to the counterpart fixing hole of the fixing column using the height padding column, and each of the fixing elements is detachably fixed between each of the plurality of second fixing holes of the expansion circuit board and the first fixing hole of each of the height padding column.

16. The electronic device according to claim 12, wherein the host comprises a flange formed correspondingly to the opening, the flange and the covering are respectively provided with a plurality of third fixing holes and a plurality of fourth fixing holes, and the covering is detachably fixed to the host by a fixing element fixed between each of the plurality of third fixing holes and each of the plurality of fourth fixing holes.

17. The electronic device according to claim 12, wherein the host comprises a flange formed correspondingly to the opening, the flange and an inner side of the covering respectively comprise a rib and an elastic portion, both the flange and the rib surround correspondingly to the opening, and the elastic portion is fixed at the host by the covering and is pressed by the rib to be correspondingly elastically recessed.

18. The electronic device according to claim 12, wherein the covering comprises a first recess and a second recess, the second recess is provided with the insertion slot, the lid comprises a fixing plate, a movable plate and a bending portion connected between the fixing plate and the movable plate, the fixing plate is fixed in the first recess, and the movable plate is accommodated in a liftable and covering manner by the bending portion in the second recess.

19. The electronic device according to claim 18, wherein the covering further comprises a plurality of in-recess fixing columns projecting from the first recess, each of the in-recess fixing columns has a fifth fixing hole, the fixing plate is provided with a plurality of sixth fixing holes respectively corresponding to the plurality of fifth fixing holes, and the lid is detachably fixed to the covering by a fixing element fixed between each of the plurality of fifth fixing holes and each of plurality of the sixth fixing holes.

20. The electronic device according to claim 12, wherein when the covering of the anti-collision module covers the opening, the insertion slot is positioned to align with the expansion connector.

* * * * *